US012749972B2

(12) United States Patent
Huang et al.

(10) Patent No.: US 12,749,972 B2
(45) Date of Patent: Sep. 29, 2026

(54) METHOD FOR CONTROLLING SWITCHED CAPACITOR BUCK CIRCUIT OF POWER SUPPLY AND POWER SUPPLY

(71) Applicant: OmniOn Power Technology GmbH, Baden (CH)

(72) Inventors: Zhongmin Huang, Shanghai (CN); Rui Wu, Shanghai (CN); Wen Luo, Shanghai (CN)

(73) Assignee: OmniOn Power Technology GmbH, Baden (CH)

( * ) Notice: Subject to any disclaimer, the term of this patent is extended or adjusted under 35 U.S.C. 154(b) by 130 days.

(21) Appl. No.: 18/497,217

(22) Filed: Oct. 30, 2023

(65) Prior Publication Data

US 2024/0146180 A1 May 2, 2024

(30) Foreign Application Priority Data

Oct. 31, 2022 (CN) ......................... 202211352024.4

(51) Int. Cl.
*H02M 3/158* (2006.01)
*H02M 1/00* (2007.01)
*H02M 3/07* (2006.01)

(52) U.S. Cl.
CPC ......... *H02M 3/158* (2013.01); *H02M 1/0043* (2021.05); *H02M 3/072* (2021.05)

(58) Field of Classification Search
CPC ......... H02M 3/01–015; H02M 1/0058; H02M 3/155; H02M 3/157–1588; H02M 3/335; H02M 3/33569; H02M 3/33592; H02M 3/158; H02M 1/08; H02M 3/07–078
See application file for complete search history.

(56) References Cited

U.S. PATENT DOCUMENTS

2014/0176097 A1* 6/2014 Huang ................ H02M 3/1584 323/272
2017/0324326 A1* 11/2017 Liu ....................... H02M 1/088
2020/0177083 A1* 6/2020 Zambetti ............... H02M 3/158
2023/0188028 A1* 6/2023 Wu ......................... H02M 3/07 363/116

* cited by examiner

*Primary Examiner* — Monica Lewis
*Assistant Examiner* — Ularislao Cordova
(74) *Attorney, Agent, or Firm* — CKC & Partners Co., LLC

(57) ABSTRACT

In one embodiment, a first end of a second switch is connected to a voltage input terminal of a power supply, a second end of the second switch is connected to a first end of a first capacitor and a first end of a first switch, a second end of the first switch is connected to a first end of a first complementary switch and a first end of a first output inductor, a second end of the first capacitor is connected to a first end of a second complementary switch and a first end of a second output inductor, and a second end of the first complementary switch and a second end of the second output inductor are connected to a voltage output terminal of the power supply. A controller is configured to control switching of the first switch and to control switching of the second switch.

13 Claims, 13 Drawing Sheets

501

METHOD FOR CONTROLLING SWITCHED CAPACITOR BUCK CIRCUIT OF POWER SUPPLY AND POWER SUPPLY

CROSS-REFERENCE TO RELATED APPLICATIONS

This application claims priority to Chinese Patent Application No. 202211352024.4, filed Oct. 31, 2022, and titled "METHOD FOR CONTROLLING SWITCHED CAPACITOR BUCK CIRCUIT OF POWER SUPPLY AND POWER SUPPLY", which is hereby incorporated by reference in its entirety.

BACKGROUND

Embodiments of the present disclosure generally relate to the electrical field, in particular a method for controlling a switched capacitor buck circuit of a power supply and a power supply.

Nowadays, switching power supplies are used in massive devices or apparatus such as smartphones, computers and peripherals, digital households, vehicles (Electronic Control Unit (ECU)), and the like. The switching power supply includes a DC/DC converter circuit for converting a DC voltage to a further DC voltage. The DC/DC converter circuit has a variety of topologies to implement the corresponding voltage conversion function.

The switched capacitor buck converter is a topology of interest. The switched capacitor buck converter typically includes a plurality of switching elements, an output inductor, and an output capacitor. The voltage conversion function of the switched capacitor buck converter is achieved by closing and opening the plurality of switch elements periodically in a predetermined sequence. During the operation of the switched capacitor buck converter, energy is accumulated in the input inductor by means of switching cooperation of corresponding switching elements. Then, the switching state of the switching elements are changed to cause the output inductor to release the previously accumulated energy to a load. The switched capacitor buck converter converts the input voltage to a specified voltage by alternately repeating the switching cycles. In addition, the specified output voltage can be obtained by setting a duty cycle of the switching elements.

BRIEF DESCRIPTION

Embodiments of the present disclosure provide a solution of detecting a line state of an electrical device, to at least solve the problem existing in the prior art when detecting a line state of an electrical device.

A first aspect of the present disclosure relates to a power supply. The power supply includes a buck circuit and a controller for controlling the buck circuit, wherein the buck circuit includes a first switch, a first complementary switch, a second switch, a second complementary switch, a first capacitor, a first output inductor, and a second output inductor, wherein a first end of the second switch is connected to a voltage input terminal of the power supply, a second end of the second switch is connected to a first end of the first capacitor and a first end of the first switch, a second end of the first switch is connected to a first end of the first complementary switch and a first end of the first output inductor, a second end of the first capacitor is connected to a first end of the second complementary switch and a first end of the second output inductor, a second end of the first complementary switch and a second end of the second output inductor are connected to a voltage output terminal of the power supply. The controller is configured to: use a first duty cycle to control switching of the first switch; and use a second duty cycle to control switching of the second switch, a switching cycle of the first switch being equal to a switching cycle of the second switch with respect to cycle length. The first duty cycle is greater than 0.5, and the second duty cycle is equal to 0.5.

According to implementations of the present disclosure, in the case where the desired duty cycle is greater than 0.5, only the desired duty cycle is used to control switches in a loop corresponding to the first output inductor, and a duty cycle of the switches in a loop including the capacitor and corresponding to the second output inductor is limited to 0.5, such that currents across the first output inductor and the second output inductor are substantially equal, to thus achieve output stability.

In some embodiments, a time of switching the second switch S2 from open to closed is different from a time of switching the first switch from closed to open by half of the cycle length.

In some embodiments, the controller is coupled to the first complementary switch, and configured to control the first complementary switch to open in a case where the first switch is closed and to control the first complementary switch to close in a case where the first switch is open. The controller is further coupled to the second complementary switch, and configured to control the second complementary switch to open in a case where the second switch is closed and to control the second complementary switch to close when the second switch is open. In those embodiments, corresponding complementary switches are controlled with opposite switch controlling manners, to achieve a desired buck function.

In some embodiments, the controller includes: a first control unit with a first end coupled to a control terminal of the first switch and a second end coupled to a control terminal of the first complementary switch, the first control unit configured to send a control signal to the control terminal of the first switch and the control terminal of the first complementary switch; and a second control unit with a first end coupled to a control terminal of the second switch and a second end coupled to a control terminal of the second complementary switch, the second control unit configured to send a control signal to the control terminal of the second switch and the control terminal of the second complementary switch. In those embodiments, the same control units are used to control the two complementary switches, to simplify the configuration of the controller.

In some embodiments, the controller further includes: a duty cycle generation unit configured to generate the first duty cycle; and a duty cycle limiter coupled between the duty cycle generation unit and the second control unit, and configured to output the second duty cycle of 0.5 to the second control unit in response to determining that the first duty cycle received from the duty cycle generation unit is greater than 0.5. In those embodiments, with the arrangement of a duty cycle limiter, the duty cycle transmitted to the second control unit can be limited to 0.5, to thus implement the control solution according to the present disclosure.

In some embodiments, the duty cycle generation unit includes a duty cycle generator configured to: acquire a reference output voltage and an input voltage of the voltage input terminal; and generate the first duty cycle based on the reference output voltage and the input voltage. In those embodiments, with the arrangement of a duty cycle generator, a desired duty cycle can be generated automatically based on the reference output voltage and the input voltage.

In some embodiments, the first duty cycle is determined through the following formula:

$$D = \frac{2 * V_{out}}{V_{in}}$$

where $V_{in}$ is the input voltage, $V_{out}$ is the reference output voltage, and D is the first duty cycle. In those embodiments, the formula of determining the duty cycle is identical to the one employed in the case where the desired duty cycle is less than 0.5, to thus reduce the complexity of the duty cycle computing.

In some embodiments, the duty cycle generation unit further includes: a duty cycle comparator coupled to the voltage output terminal and configured to determine a difference between an output voltage at the voltage output terminal and the reference output voltage; and a regulator coupled between the duty cycle comparator and the duty cycle generator and configured to determine, based on the difference determined by the duty cycle comparator, a duty cycle adjustment value, wherein the duty cycle generator is further configured to adjust the first duty cycle based on the duty cycle adjustment value received. In those embodiments, with the arrangement of a comparator and a regulator, the duty cycle can be compensated when the output voltage deviates from the reference voltage, to make it adapted to the current output voltage and thus maintain a stable output voltage.

In some embodiments, the buck circuit further includes a third switch, a third complementary switch, a fourth switch, a fourth complementary switch, a second capacitor, a third output inductor, and a fourth output inductor, wherein a first end of the fourth switch is connected to the voltage input terminal, a second end of the fourth switch is connected to a first end of the second capacitor and a first end of the third switch, a second end of the third switch is connected to a first end of the third complementary switch and a first end of the third output inductor, a second end of the second capacitor is connected to a first end of the fourth complementary switch and a first end of the fourth output inductor, a second end of the third complementary switch and a second end of the fourth complementary switch are grounded, and a second end of the third output inductor and a second end of the fourth output inductor are connected to the voltage output terminal. A control terminal of the third switch is connected to the control terminal of the first switch, a control terminal of the third complementary switch is connected to the control terminal of the first complementary switch, a control terminal of the fourth switch is connected to the control terminal of the second switch, and a control terminal of the fourth complementary switch is connected to the control terminal of the second complementary switch. In those embodiments, by increasing a stage of circuit, the output power can be boosted, and by utilizing the same control manner as those in other stages, it can be guaranteed that each stage of circuit can implement the control solution according to the present disclosure.

A second aspect of the present disclosure relates to a method for controlling a power supply. The power supply includes a buck circuit that includes a first switch, a first complementary switch, a second switch, a second complementary switch, a first capacitor, a first output inductor, and a second output inductor, wherein a first end of the second switch is connected to a voltage input terminal of the power supply, a second end of the second switch is connected to a first end of the first capacitor and a first end of the first switch, a second end of the first switch is connected to a first end of the first complementary switch and a first end of the first output inductor, a second end of the first capacitor is connected to a first end of the second complementary switch and a first end of the second output inductor, a second end of the first complementary switch and a second end of the second complementary switch are grounded, and a second end of the first output inductor and a second end of the second output inductor are connected to a voltage output terminal of the power supply. The method includes: using a first duty cycle to control switching of the first switch; and using a second duty cycle to control switching of the second switch, a switching cycle of the first switch being equal to a switching cycle of the second switch with respect to cycle length, wherein the first duty cycle is greater than 0.5, and the second duty cycle is equal to 0.5.

In some embodiments, the method further includes: after half of the cycle length following controlling the second switch from open to closed, controlling the first switch from open to closed.

In some embodiment, the method further includes: acquiring a reference output voltage and an input voltage of the voltage input terminal (VIN); determining a first duty cycle based on the reference voltage and the input voltage; and in response to determining that the first duty cycle is greater than 0.5, determining the second duty cycle is 0.5.

In some embodiments, the method further includes: in response to determining that the first duty cycle is less than 0.5, determining that the second duty cycle is equal to the first duty cycle.

In some embodiments, the method further includes: detecting an output voltage at the voltage output terminal; comparing the output voltage with the reference output voltage; and in response to determining that a difference between the output voltage and the reference output voltage is greater than a predetermined threshold, determining the first duty cycle based on a current input voltage and the reference output voltage.

In some embodiments, the first duty cycle is determined through the following formula:

$$D = \frac{2 * V_{out}}{V_{in}}$$

where $V_{in}$ is the input voltage, $V_{out}$ is the reference output voltage, and D is the first duty cycle.

It would be appreciated that the power supply structure according to the first aspect of the present disclosure corresponds to the method according to the second aspect.

BRIEF DESCRIPTION OF THE DRAWINGS

The above and other objectives, features, and advantages of the present disclosure will become more apparent through the following detailed description of the example embodiments with reference to the accompanying drawings. In the drawings, multiple embodiments of the present disclosure will be illustrated in an exemplary way, without limitation, where.

DETAILED DESCRIPTION

Figure 1A:
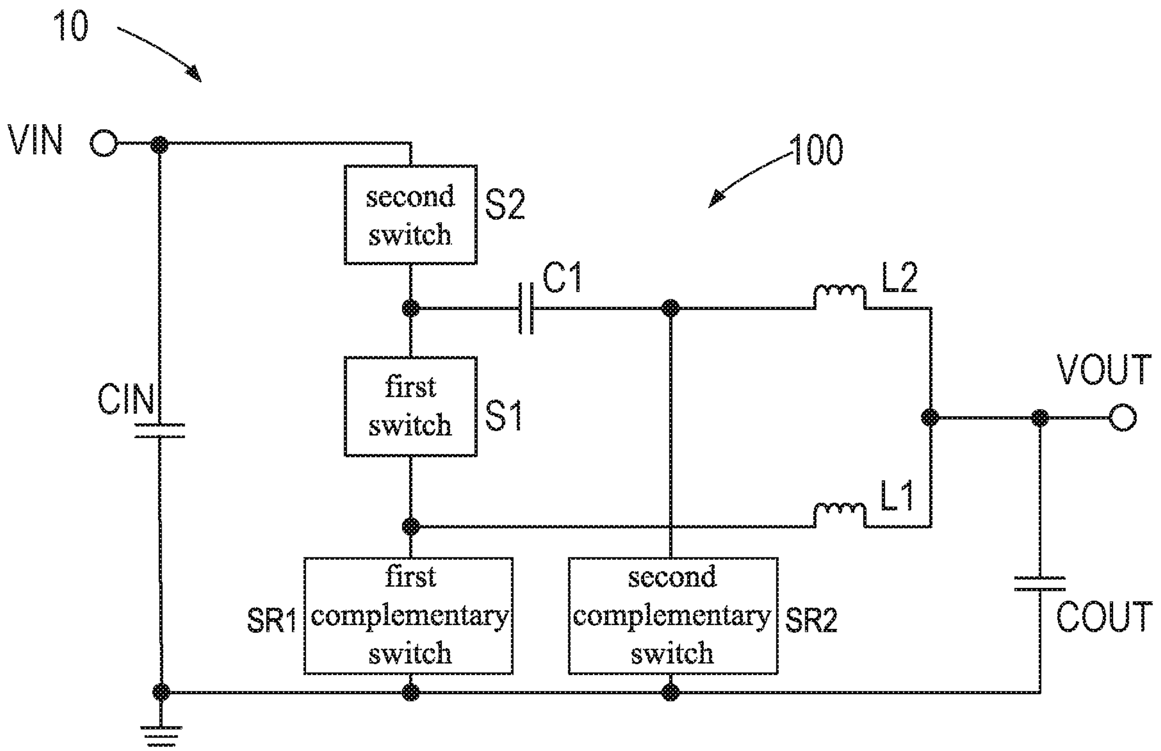
FIG. 1A illustrates a schematic diagram of an example power supply where embodiments of the present disclosure can be implemented.

Reference now will be made to the various example embodiments shown in the drawings to illustrate the principle of the present disclosure. It would be appreciated that the description on those embodiments are provided merely to enable those skilled in the art to better understand and further carry out the present disclosure, without suggesting any limitation to the scope of the present disclosure. It is worth nothing that similar or same reference symbols are used in the drawings if possible, and they are used to denote the similar or same functions. Those skilled in the art could easily realize that the alternative embodiments of the structure and method illustrated in the following description could be employed without departing from the principle of the present disclosure described here.

As used herein, the term "includes" and its variants are to be read as open-ended terms that mean "includes, but is not limited to." The term "based on" is to be read as "based at least in part on." The term "an embodiment" or "the embodiment" is to be read as "at least one embodiment." The term "another embodiment" is to be read as "at least one another embodiment." The terms "first," "second," and the like may refer to different objects or the same object. Other meanings explicit or implicit may be covered below. Unless indicated otherwise in the context, the definitions of the terms should be consistent throughout the description.

FIG. 1A illustrates a schematic diagram of an example power supply 10 where embodiments of the present disclosure can be implemented. As shown therein, the power supply 10 includes a voltage input terminal VIN, a voltage output terminal VOUT, and a switched capacitor buck circuit 100 coupled between the voltage input terminal VIN and the voltage output terminal VOUT. The switched capacitor buck circuit 200 includes a first switch S1, a second switch S2, a first complementary switch SR1, a second complementary switch SR2, and a first capacitor C. The first end of the second switch S2 is connected to the voltage input terminal VIN. The second end of the second switch S2 is connected to the first end of the first capacitor C1 and the first end of the first switch S1 of the switched capacitor buck circuit 200. The second end of the first switch S1 is connected to the first end of the first complementary switch SR1 and the first end of the first output inductor L1. The second end of the first capacitor C1 is connected to the first end of the second complementary switch SR2 and the first end of the second output inductor L2. The second end of the first output inductor L1 and the second end of the second output inductor L2 are connected to the first end of the output capacitor COUT and the voltage output terminal VOUT. The second end of the output capacitor COUT is grounded. The second end of the first complementary switch SR1 and the second end of the second complementary switch SR2 are grounded.

Figure 1B:
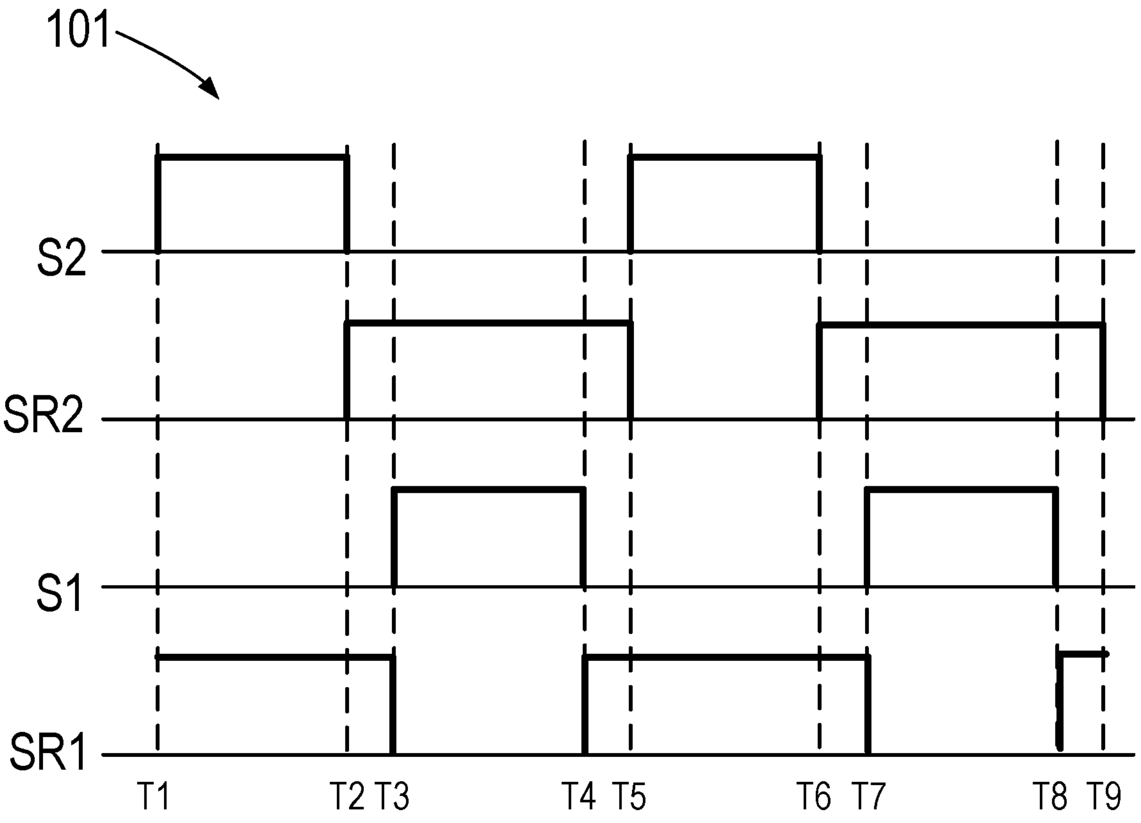
FIGS. 1B-1C illustrate a time-dependent diagram of control signals for controlling the power supply in FIG. 1A.
Figure 1C:
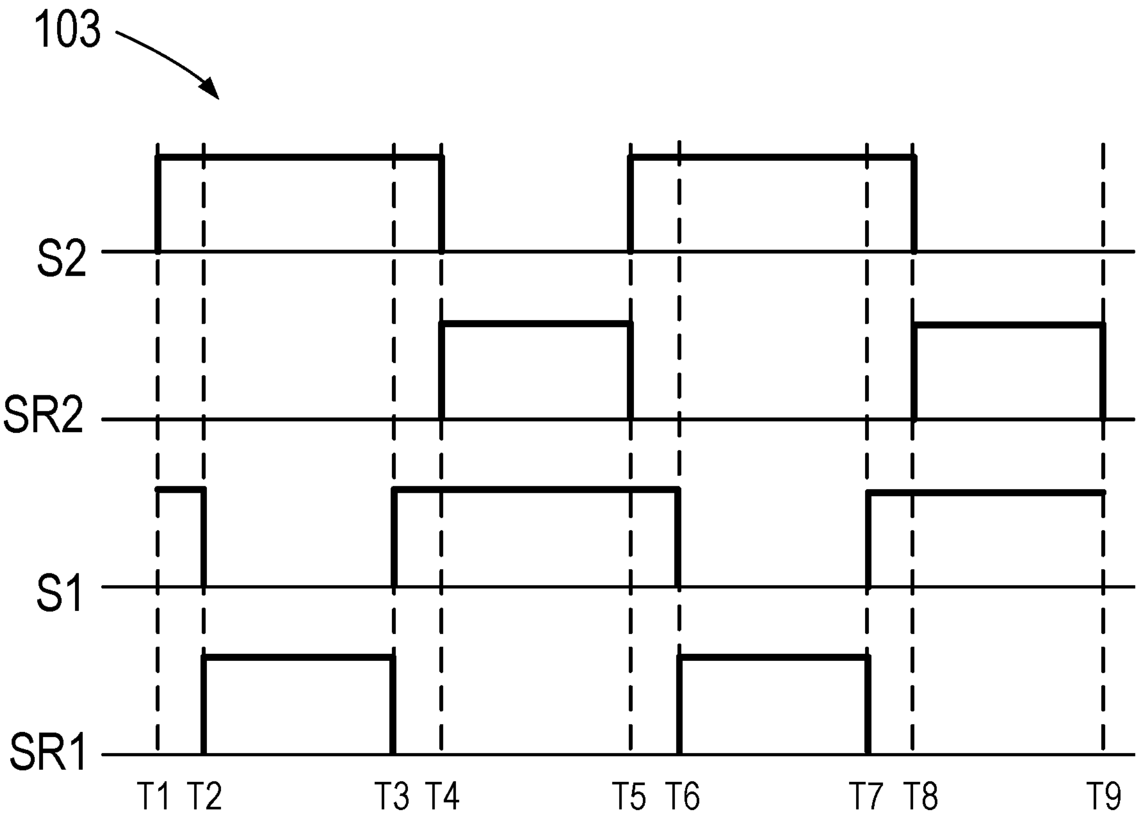

According to the circuit of the power supply 10, the output voltage at the voltage output terminal VOUT is dependent on an input voltage at the voltage input terminal VIN and a ratio of a closed time to an open time of each switch in the circuit, i.e., a duty cycle. In order to allow the power supply 10 to output a desired voltage at the voltage output terminal VOUT, it is required to control switching of the first switch S1, the second switch S2, the first complementary switch SR1, and the second complementary switch SR2 with a specific duty cycle, so as to match the input voltage. In legacy, the first switch S1 associated with the first output inductor and the second switch S2 associated with the second output inductor L2 have the same duty cycle. Reference below will be made to FIGS. 1B and 1C to describe in detail control of the switches in the switched capacitor buck circuit 200 when different duty cycle ranges are provided.

FIG. 1B illustrates a time-dependent diagram of control signals when the duty cycle D is less than 0.5. As shown therein, at a moment T1, the control signal SI2 for controlling the second switch S2 and the control signal SIR1 for controlling the first complementary switch SR1 are at a high level, to cause the second switch S2 and the first complementary switch SR1 to close. The control signal SI1 for controlling the first switch S1 and the control signal SIR2 for controlling the second complementary switch SR2 are at a low level, to cause the first switch S1 and the second complementary switch SR2 to close.

At a moment T2 having a D*T interval away from the moment T1, the signal SI2 is at a low level, to cause the second switch to open. In the meantime, the signal SIR2 is at a high level, to cause the second complementary switch SR2 to close. In the first phase [T1, T2], the first switch S1 corresponding to the first out inductor L1 is opened, and the voltage across the first output inductor L1 is $V_{out}$. In contrast, the second switch S2 corresponding to the second output inductor L2 is closed, the voltage across the second output inductor L2 is $V_{in}-V_c-V_{out}$, where $V_c$ is the voltage at the first capacitor C1, $V_{out}$ is the voltage at the voltage output terminal VOUT, and $V_{in}$ is the voltage at the voltage input terminal VIN. The duration of the first phase [T1, T2] is $$t_1=D*T \quad (1).$$

At a moment T3 having a T/2 (i.e., half of a switching cycle) interval away from the moment T1, the signal SI1 is at a high level, to cause the first switch S2 to close. The signal SIR 1 is at a low level, to cause the first complementary switch SR1 to open. In the second phase [T2, T3], the first switch S1 corresponding to the first output inductor L1, and the voltage across the first output inductor L1 is $V_{out}$. In contrast, the second switch S2 corresponding to the second output inductor L2 is opened, and the voltage across the second output inductor L2 is $V_{out}$. The duration of the second phase [T2, T3] is:

$$t_2=(0.5-D)*T \quad (2).$$

At a moment T4 having a D*T interval away from the moment T3, the signal SI1 is at a low level, to cause the first switch to open, and the signal SIR1 is at a high level, to cause the first complementary switch SR1 to close. In the third phase [T3, T4], the first switch S1 corresponding to the first output inductor L1 is closed, and the voltage across the first output inductor L1 is $V_c-V_{out}$. In contrast, the second switch S2 corresponding to the second output inductor L2 is opened, and the voltage across the second output inductor L2 is $V_{out}$. The duration of the third phase [T3, T4] is:

$$t_3=D*T \quad (3).$$

At a moment T5 having a T/2 interval away from the moment T3, the signal SIR is at a high level, to cause the second complementary switch SR2 to open, and the signal S2 is at a low level, to cause the second switch S2 to close. In the fourth phase [T4, T5], the first switch S1 corresponding to the first output inductor L1 is opened, and the voltage across the first output inductor L1 is $V_{out}$. In contrast, the second switch S2 corresponding to the second output inductor L2 is opened, and the voltage across the second output inductor L2 is $V_{out}$. The duration of the fourth phase [T4, T5] is:

$$t_4=(0.5-D)*T \quad (4).$$

The description above is provided about an entire switching sequence of respective switches from the moment T1 to the moment T5. In the power supply 10, according to the principle of inductor volt-second balance (i.e., for an inductor in a steady state, a number of volt-seconds during a switch-on time (a current rising phase) should be equal to a number of volt-second during a switch-off time (a current falling phase) in terms of value), although the two have opposite symbols, volt-second equilibrium formulae of the output inductor L1 and the output inductor L2 can be obtained as follows:

$$(V_c-V_{out})*t_3=V_{out}*(t_1+t_2+t_4) \quad (5), \text{ and}$$

$$(V_{in}-V_c-V_{out})*t_1=V_{out}*(t_2+t_3+t_4) \quad (6).$$

Here, (1), (2), (3) and (4) as mentioned above are substituted into (5) and (6), to thus obtain the following relationship:

$$V_{out}=V_{in}*D/2 \quad (7).$$

According to the ampere-second balance principle of the capacitor (i.e., in a power supply in a steady state, the positive ampere-second value across the capacitor is equal to the negative ampere-second value), the following equilibrium equation at the first capacitor C1 can be obtained:

$$I_2*t_1=I_1*t_3 \quad (8).$$

Wherein, $I_1$ is a current across the output inductor L1, and $I_2$ is a current across the output inductor L2. (1) and (3) are substituted into (8), to thus obtain the following relationship:

$$I_2=I_1 \quad (9).$$

It can be seen therefrom that, in the control manner as shown in FIG. 1B, the current across the output inductor L1 and the current across the output inductor L2 are equal.

FIG. 1C illustrates a time-dependent diagram of control signals when the duty cycle D is greater than 0.5. As shown therein, at a moment T1, the signals SI2 and the signal SI1 are at a high level, to cause the first switch S2 and the first switch S1 to close. The signal SIR1 and the signal SIR2 are at a low level, to cause the first complementary switch SR1 and the second complementary switch SR2 to open. At a moment T2 having a (D−0.5)*T interval away from the moment T1, the signal SI1 is at a low level, to cause the first switch to open, and the signal SIR is at a high level, to cause the first complementary switch SR1 to close.

In the first phase [T1, T2], the first switch S1 corresponding to the first output inductor L1 is closed, and the voltage across the first output inductor L1 is $V_{in}-V_{out}$. In contrast, the second switch S2 corresponding to the second output inductor L2 is closed, and the voltage across the second output inductor is $V_{in}-V_c-V_{out}$. The duration of the first phase [T1, T2] is:

$$t_1=(D-0.5)*T \quad (10).$$

At a moment T3 having a T/2 interval away from the moment T1, the signal SIR is at a low level, to cause the first complementary switch SR1 to open, and the signal SI1 is at a high level, to cause the first switch S1 to close. In the second phase [T2, T3], the first switch S1 corresponding to the first output inductor L1 is opened, and the voltage across the first output inductor L1 is $V_{out}$. In contrast, the second switch S2 corresponding to the second output inductor L2 is closed, and the voltage across the second output inductor L2 is $V_{in}-V_c-V_{out}$. The duration of the second phase [T2, T3] is:

$$t_2=(1-D)*T \quad (11).$$

At a moment T4 having a (D−0.5)*T interval away from the moment T3, the signal SI2 is at a low level, to cause the second switch S2 to open, and the signal SIR 2 is at a high level, to cause the second complementary switch SR2 to close. In the third phase [T3, T4], the first switch S1 corresponding to the first output inductor L1 is closed, and the voltage across the first output inductor L1 is $V_{in}-V_c-V_{out}$. The duration of the third phase [T3, T4] is:

$$t_3=(D-0.5)*T \quad (12).$$

At a moment T5 having a T/2 interval away from the moment T3, the signal SIR2 is at a high level, to cause the second complementary switch SR2 to close, and the signal SI2 is at a low level, to cause the second switch S2 to open. In the fourth phase [T4, T5], the first switch S1 corresponding to the first output inductor L1 is closed, and the voltage across the first output inductor L1 is $V_c-V_{out}$. In contrast, the second switch S2 corresponding to the second output inductor L2 is opened, and the voltage across the second output inductor L2 is $V_{out}$. The duration of the fourth phase [T4, T5] is:

$$t_4=(1-D)*T \quad (13).$$

The description above is provided about an entire switching sequence of respective switches from the moment T1 to the moment T5. In the power supply 10, according to the principle of inductor volt-second balance, volt-second equilibrium formulae of the output inductor L1 and the output inductor L2 can be obtained as follows:

$$(V_{in}-V_{out})*(t_1+t_3)+(V_c-V_{out})*t_4=V_{out}*t_2 \quad (14), \text{ and}$$

$$(V_{in}-V_c-V_{out})*(t_1+t_2+t_3)=V_{out}*t_4 \quad (15).$$

Here, (10), (11), (12) and (13) as mentioned above are substituted into (14) and (15), to thus obtain the following relationship:

$$V_{out}=V_{in}*D^2 \quad (16).$$

According to the ampere-second balance principle of the capacitor, the following equilibrium equation at the first capacitor C1 can be obtained:

$$I_2*(t_1+t_2+t_3)=I_1*t_4 \quad (17).$$

(10), (11), (12) and (13) are substituted into (17), to obtain the following relationship:

$$I_2=I_1(1-D)/D \quad (18).$$

Figure 1D:
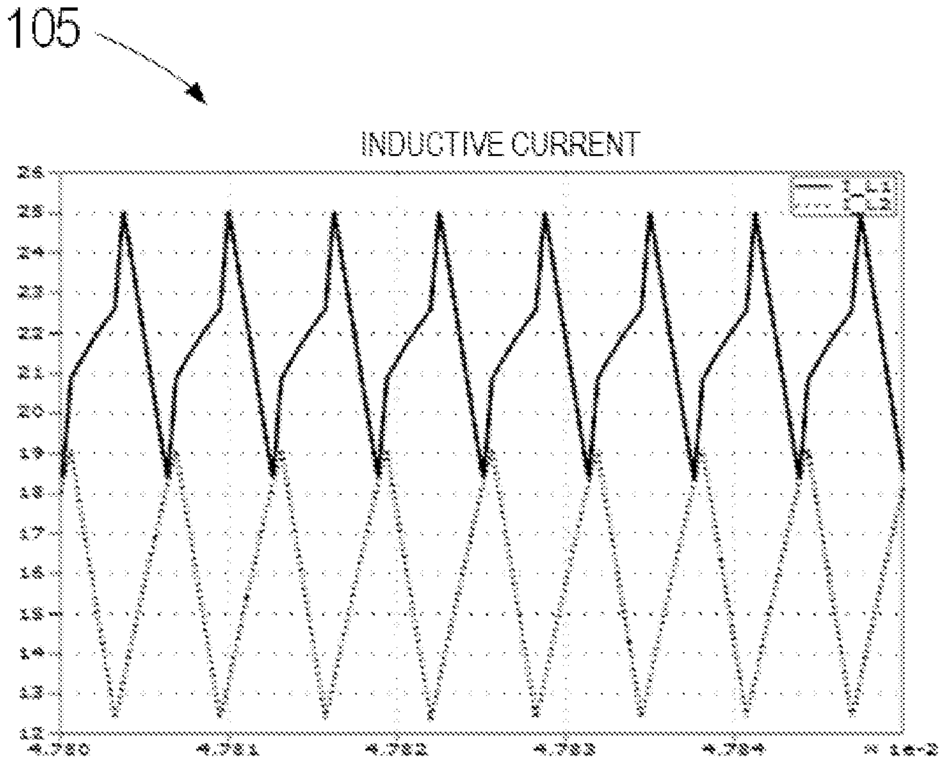
FIG. 1D illustrates a waveform diagram of inductor current when controlling a control circuit using the control timing in FIG. 1C.
Figure 1E:
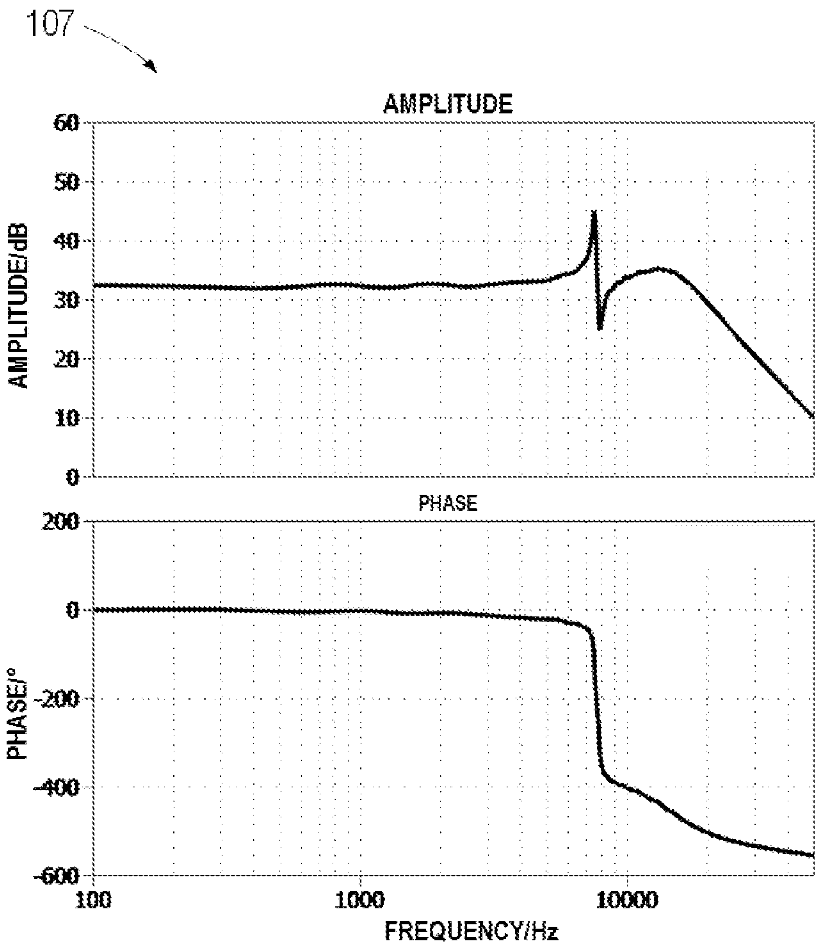
FIG. 1E illustrates a Bode diagram of power stages when controlling a control circuit using the control timing in FIG. 1C.

It can be seen that, when the duty cycle is greater than 0.5, the respective currents across the output inductor L1 and the output inductor L2 are different, i.e., the currents are not balanced. FIG. 1D illustrates a waveform diagram 105 of inductor currents when the power supply 10 is controlled in the control manner as shown in FIG. 1C. The output inductor L1 is shown with solid lines, and the output inductor L2 is shown with dotted lines. From FIG. 1D, it can be seen that the currents across the two inductors are different. Moreover, FIG. 1E illustrates a Bode diagram of power stages when the power supply is controlled in the control method as shown in FIG. 1C. From FIG. 1E, it can be seen that the phase margin drops sharply near 10,000 Hz, and the stability decreases dramatically.

Therefore, the control manner as shown in FIG. 1C, where the power supply 10 is controlled with the same duty cycle greater than 0.5, has the following two disadvantages:

1) the voltage transmission relationship when the duty cycle is less than 0.5 is different than the one when the duty cycle is greater than 0.5, which means that two sets of loop control parameters are required to achieve control of voltage loops, and when the duty cycle is greater than 0.5, the phase lag is increased obviously, affecting the response speed of the control loop; and when the duty cycle is greater than 0.5, the two loops of inductor currents are not balanced.

To this end, the present disclosure provides a solution of controlling a power supply when the duty cycle is greater than 0.5. In the solution, when the duty cycle is greater than 0.5, it is to limit the duty cycle of switches in a loop including a capacitor at 0.5. As such, the relationship between the input voltage and the output voltage is consistent in the case where the duty cycle is greater than 0.5 and in the further case where the duty cycle is less than 0.5, and when the duty cycle is greater than 0.5, the currents across the two output inductors are the same.

Figure 2:
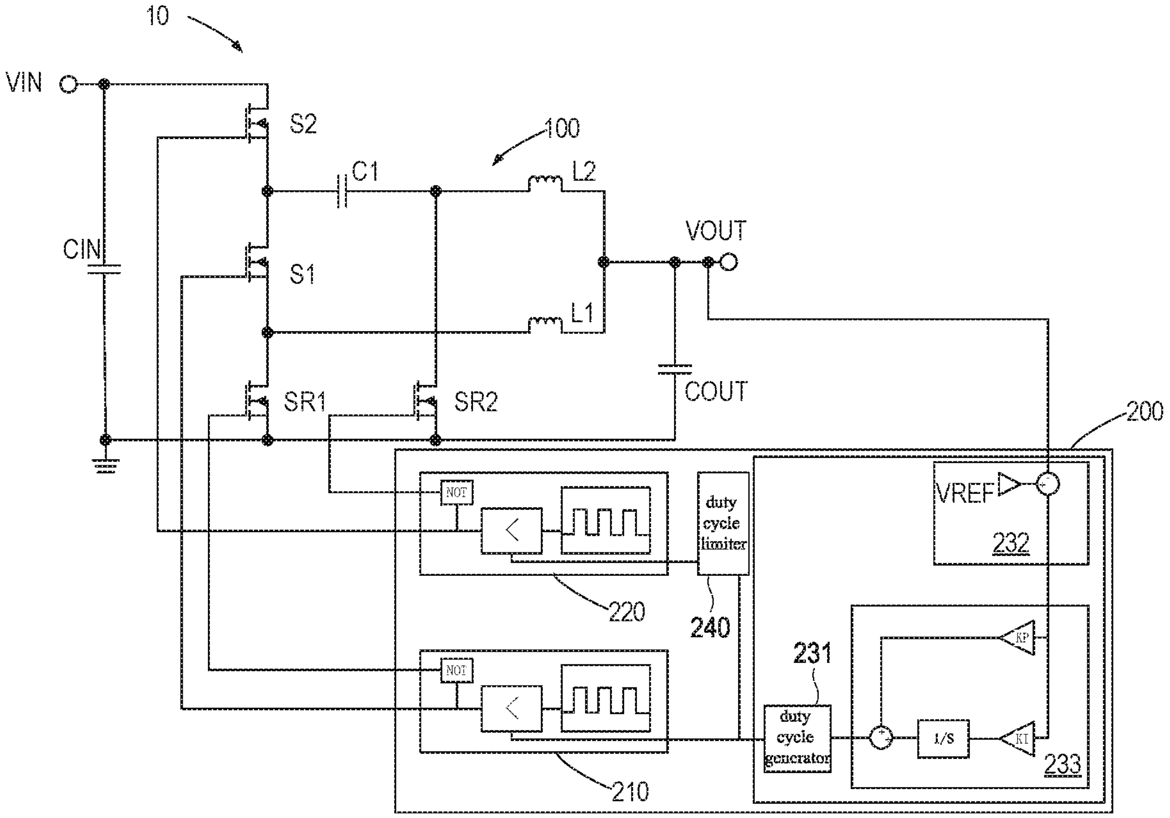
FIG. 2 illustrates a schematic diagram of an example power supply according to embodiments of the present disclosure.

FIG. 2 illustrates an example power supply 10 according to embodiments of the present disclosure. As shown therein, the power supply 10 includes a switched capacitor buck circuit 100 and a controller 200 for controlling the switched capacitor buck circuit 100. In terms of structure, the switched capacitor buck circuit 100 is wholly identical to the switch capacitor buck circuit 100 in FIG. 1A. In the embodiment as shown in FIG. 2, the controller is coupled to control terminals of all switches, to transmit the generated control signal to all of the switches. The switches in the switched capacitor buck circuit 100 may be Metal-Oxide-Semiconductor Field-Effect Transistors (MOSFETs), Insulated Gate Bipolar Transistors (IGBTs), or triodes.

Figure 3:
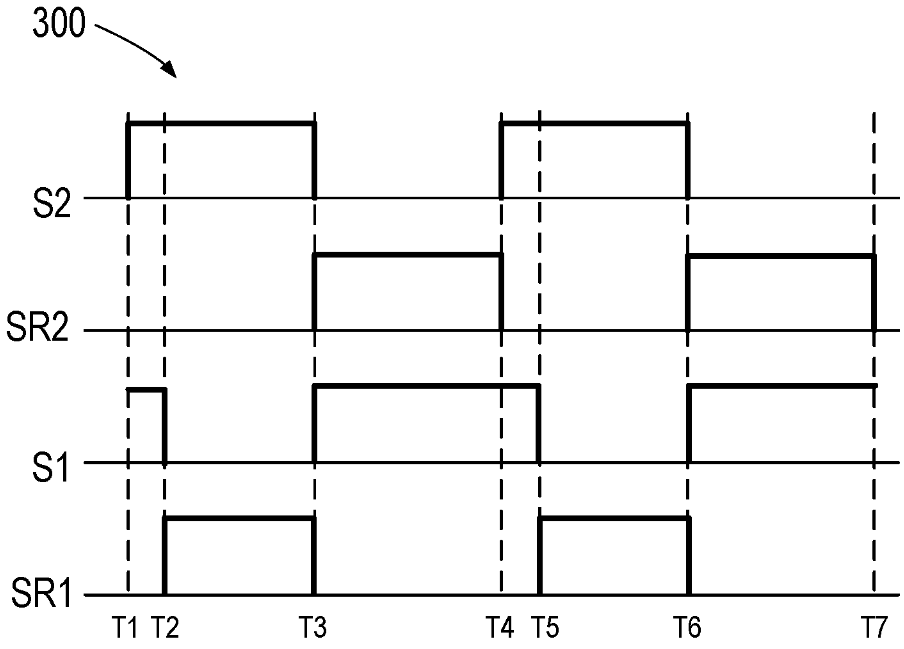
FIG. 3 illustrates a time-dependent diagram of signals for controlling a buck circuit of a power supply according to the present disclosure.

When it is determined that the duty cycle is less than 0.5, the controller 200 can control the switched capacitor buck circuit 100 using the control signals as shown in FIG. 1B. In addition, when it is determined that the duty cycle is greater than 0.5, the control signals according to the solution of the present disclosure, as shown in FIG. 3, can be used to control the switched capacitor buck circuit 100. In the solution, a determined duty cycle is used to control the first switch S1 while a duty cycle of 0.5 is used to control the second switch S2.

FIG. 3 illustrates a time-dependent diagram of control signals used when the duty cycle D is greater than 0.5, according to the solution of the present disclosure. As shown therein, at a moment T1, the signal SI2 and the signal SI1 are at a high level, to cause the second switch S2 and the first switch S1 to close. The signal SIR2 and the signal SIR1 are at a low level, to cause the second complementary switch SR2 and the first complementary switch SR1 to open.

Figure 4A:
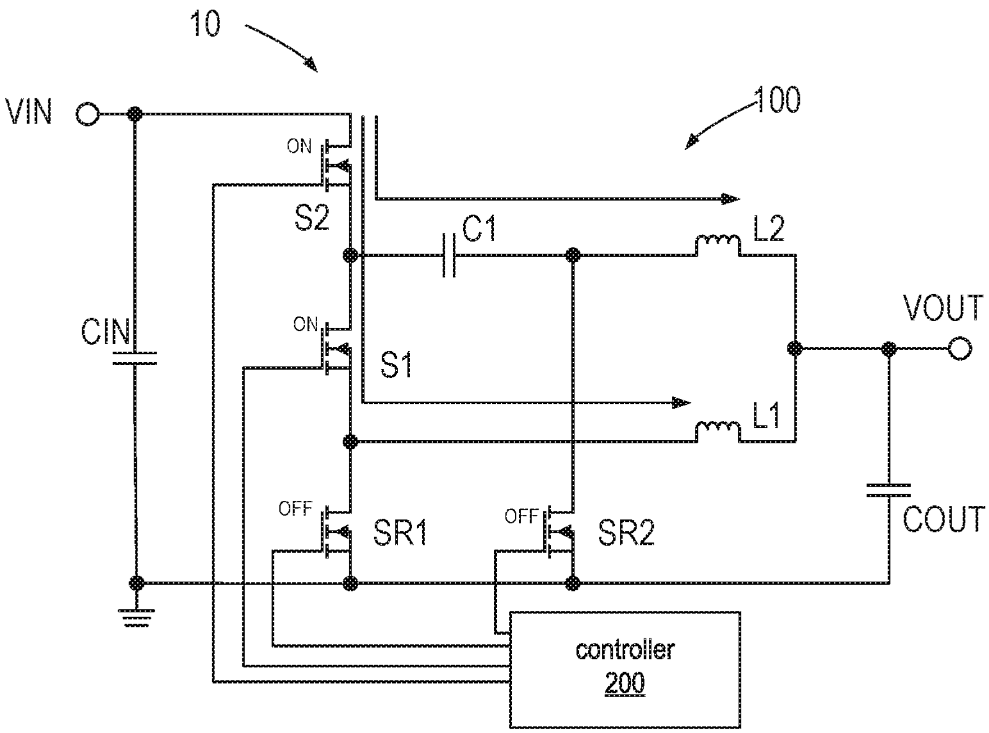
FIGS. 4A-4C illustrates schematic diagrams of circuits of a power supply at respective operation phases according to the present disclosure.

At a moment T2 having a (D−0.5)*T interval away from the moment T1, the signal SI1 is at a low level, to cause the first switch to open, and the signal SIR1 is at a high level, to cause the first complementary switch SR1 to close. FIG. 4A illustrates a schematic diagram of current flow directions in the first phase [T1, T2]. As shown therein, in a loop corresponding to the first output inductor L1, the first switch S1 is closed, the first complementary switch SR1 is opened, and at this time, the first output inductor L1 is connected between the voltage input terminal VIN and the voltage output terminal VOUT; the current flow direction of this loop is shown with a dashed line indicated by I1. Therefore, the voltage across the first output inductor L1 is $V_{in}-V_{out}$. In contrast, in a loop corresponding to the second output inductor L2, the second switch S2 is closed, the second complementary switch SR2 is opened, and at this time, the second output inductor L2 and the first capacitor C1 are connected in series between the voltage input terminal VIN and the voltage output terminal VOUT; the current flow direction of this loop is shown with a dashed line indicated by I2. Accordingly, the voltage across the second output inductor L2 is $V_{in}-V_c-V_{out}$. The duration of the first phase [T1, T2] is:

$$t_1=(D-0.5)*T \quad (19).$$

Figure 4B:
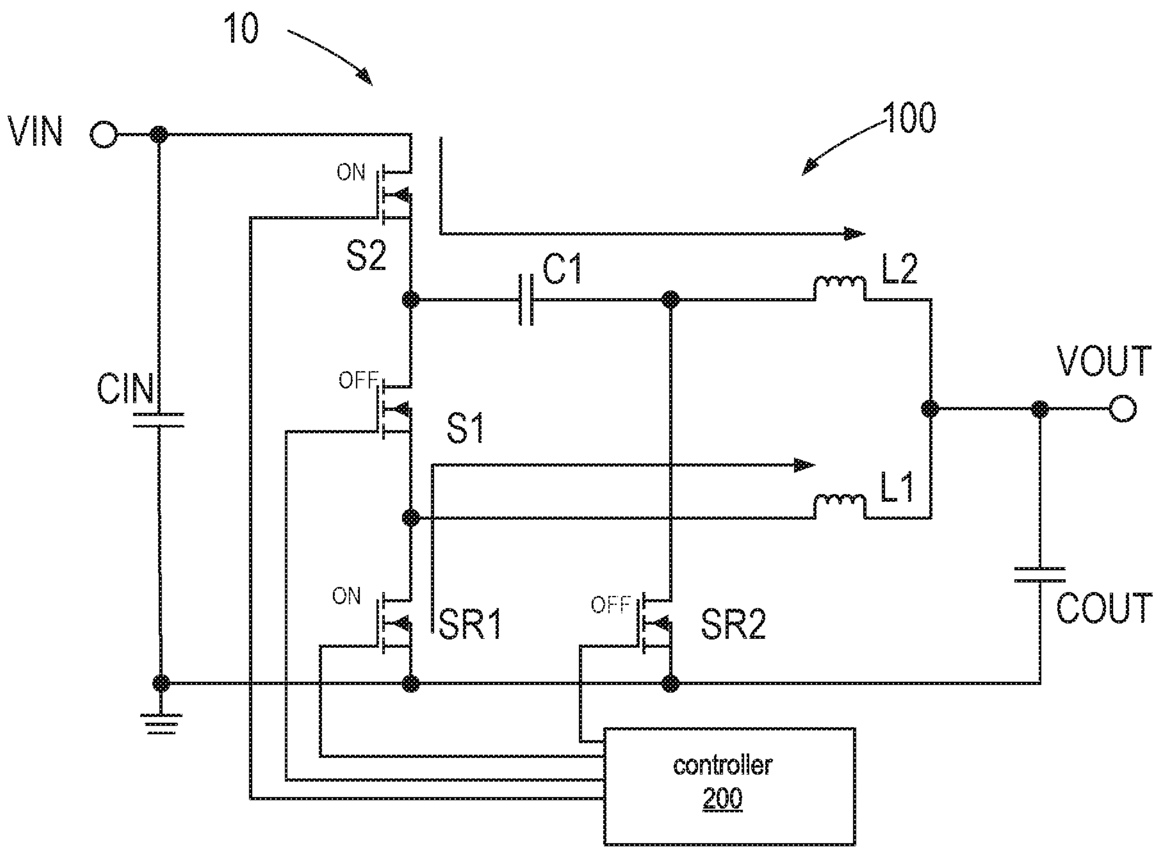

Returning to FIG. 3, at a moment T3 having a T/2 interval away from the moment T1, the signal SIR1 is at a low level, to cause the first complementary switch SR1 to open, and the signal SI1 is at a high level, to cause the first switch to close. In the meantime, the signal SI2 is at a low signal, to cause the switch S2 to open, and the signal SIR2 is at a high level, to cause the second complementary switch SR2 to close. FIG. 4B illustrates a schematic diagram of current flow directions during a second phase [T2, T3]. As shown therein, in a loop corresponding to the first output inductor L1, the first complementary switch SR1 is closed, the first switch S1 is opened, and at this time, the first output inductor L1 is connected between the ground and the voltage output terminal VOUT; the current flow direction of this loop is shown with a dashed line indicated by $I_1$. Therefore, the voltage across the first output inductor L1 is $V_{out}$. In contrast, at this time, the second output inductor L2 and the first capacitor C1 are still connected in series between the voltage input terminal VIN and the voltage output terminal VOUT, and the current flow direction of this loop is shown with a dashed lined identified by I2. Accordingly, the voltage across the second output inductor L2 is $V_{in}-V_c-V_{out}$. The duration of the second phase [T2, T3] is:

$$t_2=(1-D)*T \quad (20).$$

Figure 4C:
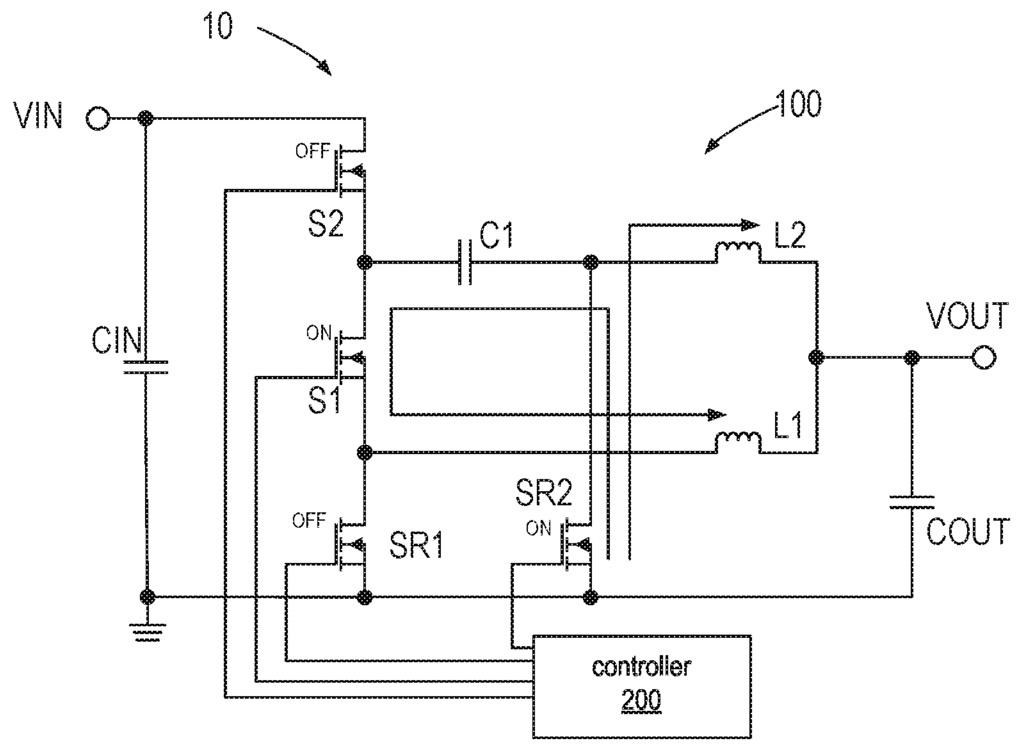

Back to FIG. 3 again, at the moment T4 having a T/2 interval away from the moment T3, the signal SI2 is at a high level, to cause the second switch S2 to close, and the signal SIR2 is at a low level, to cause the second complementary SR2 to open. FIG. 4C illustrates a schematic diagram of current flow directions during a third phase [T3, T4]. As shown therein, in a loop corresponding to the first output inductor L1, the first complementary switch SR1 is opened, the first switch S1 is closed, and at this time, the first output inductor L1 and the first capacitor C1 are connected in series between the ground and the voltage output terminal VOUT, and the current flow direction of this loop is shown with a dashed line identified by $I_1$. Therefore, the voltage across the first output inductor is $V_c - V_{out}$. In contrast, at this time, in a loop corresponding to the second output inductor L2, the second switch S2 is opened, the second complementary switch SR2 is closed, and at this time, the second output inductor L2 is connected between the ground and the voltage output terminal VOUT; the current flow direction of this loop is shown with a dashed line identified by I2. Accordingly, the voltage across the second output inductor L2 is still $V_{out}$. The duration of the third phase [T3, T4] is:

$$t_3 = T/2 \quad (21).$$

The description above is provided about an entire switching sequence of respective switches from the moment T1 to the moment T5. In the power supply 10, according to the principle of inductor volt-second balance, volt-second equilibrium formulae of the output inductor L1 and the output inductor L2 can be obtained as follows:

$$(V_{in} - V_{out})^* t_1 + (V_c - V_{out})^* t_3 = V_{out}{}^* t_2 \quad (22), \text{ and}$$

$$(V_{in} - V_c - V_{out})^* (t_1 + t_2) = V_{out}{}^* t_3 \quad (23).$$

Here, (19), (20) and (21) as mentioned above are substituted into (22) and (23), to thus obtain the following relationship:

$$V_{out} = V_{in}{}^* D/2 \quad (24).$$

According to the ampere-second balance principle of the capacitor, the following equilibrium equation at the first capacitor C1 can be obtained:

$$I_2{}^* (t_1 + t_2) = I_1{}^* t_3 \quad (25).$$

(19), (20) and (21) are substituted into (25), to obtain the following relationship:

$$I_2 = I_1 \quad (26).$$

Figure 5A:
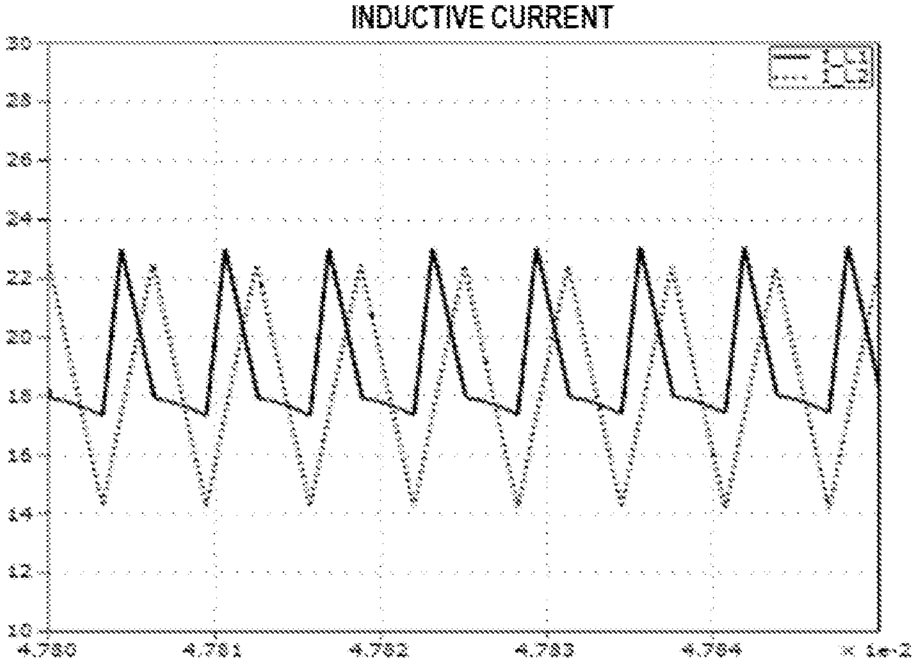
FIG. 5A illustrates a waveform diagram of inductor currents when controlling a control circuit using the control timing in FIG. 3.
Figure 5B:
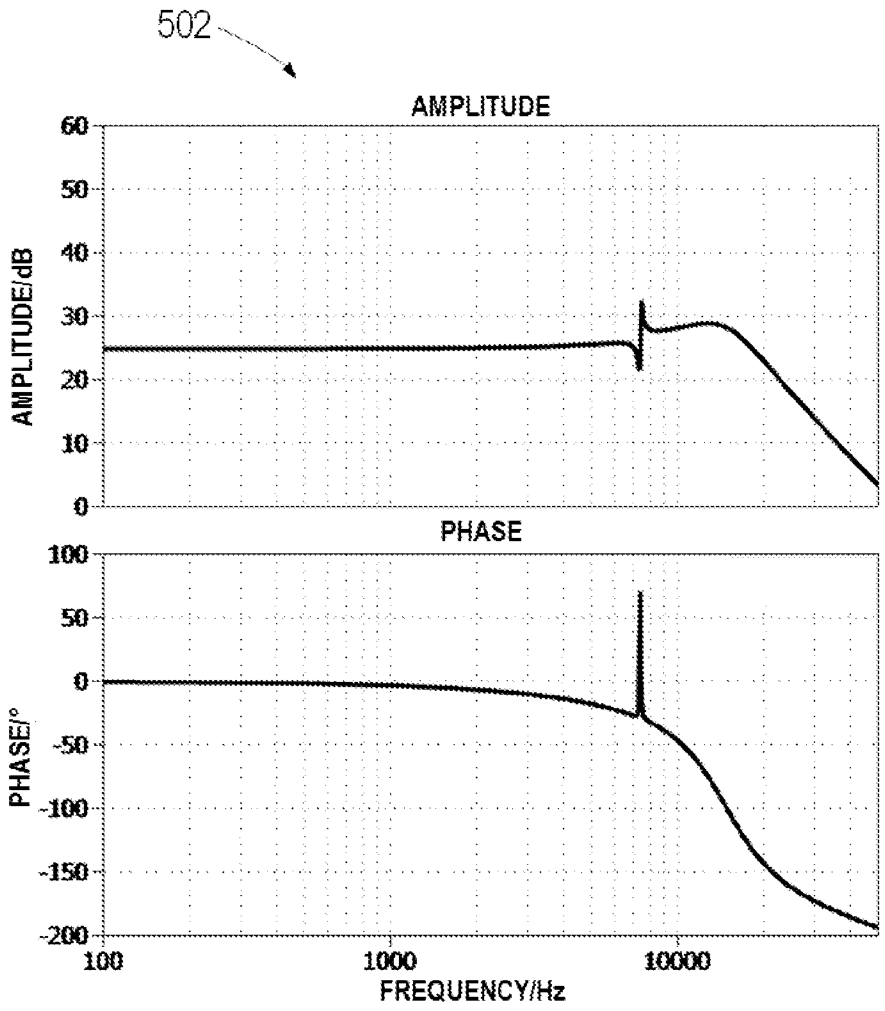
FIG. 5B illustrates a waveform diagram of inductor currents when controlling a control circuit using the control timing in FIG. 3.

When the power supply 10 is controlled using the signal sequence as shown in FIG. 3, the obtained relationship between the input voltage and the output voltage and the relationship between currents across the two inductors are identical to those in the control solution when the duty cycle is less than 0.5, respectively. In this way, the voltage transmission gain formula is unified, and the two loops of inductor currents are always kept balanced. FIG. 5A illustrates a waveform 500 of inductor currents when the power supply 10 is controlled using the control manner as shown in FIG. 3. The output inductor L1 is shown with a solid line, and the output inductor L2 is shown with a dotted line. From FIG. 5A, it can be seen that the currents across the two inductors are substantially equal. In addition, FIG. 5B illustrates a Bode diagram 502 of power stages when the power supply 10 is controlled using the control manner as shown in FIG. 3. From FIG. 5B, it can be seen that the reduction in the phase margin is decreased at the high frequency band, which shows an improvement as compared with FIG. 1E.

Returning to FIG. 2 illustrating an example structure of the controller 200 that can implement the control signal sequence as shown in FIG. 3, the controller 200 includes a first control unit 210. A first end of the first control unit 210 is coupled to the control terminal of the first switch S1, and a second end thereof is coupled to the control terminal of the first complementary switch SR1. The first control unit 210 can send control signals complementary to each other to the control terminal of the first switch S1 and the control terminal of the first complementary switch SR1, i.e., signals opposite in level. The controller 200 further includes a second control unit 220. A first end of the second control unit 220 is coupled to the control terminal of the second switch S2, and a second end thereof is coupled to the control terminal of the second complementary switch SR2. Likewise, the second control unit 220 can send control signals complementary to each other to the control terminal of the second switch S2 and the control terminal of the second complementary switch SR2. The first control unit 210 and the second control unit 220 include, for example, a signal generator. The signal generated by the signal generator can be modulated using the duty cycle received by the control unit, to obtain a signal having a desired width.

The controller 200 further includes a duty cycle generation unit 230. The duty cycle generation unit 230 can generate a first duty cycle based on a desired output voltage and the acquired input voltage, for example, according to the relationship between the input voltage and the output voltage respectively expressed by the formulae (7) and (24). The duty cycle generation unit 230 transmits the generated first duty cycle to the first control unit 210 and the second control unit 220. The control unit 200 further includes a duty cycle limiter 240. The duty cycle limiter 240 is coupled between the duty cycle generation unit 230 and the second control unit 220 and configured to limit a size of the duty cycle generated by the duty cycle generation unit 230, such that the duty cycle transmitted to the second control unit 220 cannot exceed 0.5. For example, when the received duty cycle is greater than 0.5, the duty cycle limiter 240 limits the received duty cycle to 0.5 and outputs the duty cycle of 0.5 to the second control unit 220. In this way, when the determined duty cycle is greater than 0.5, the first switch S1 and the first complementary switch SR1 can be controlled using the determined duty cycle, and the second switch S2 and the second complementary switch SR2 can be controlled using the duty cycle equal to 0.5.

Specifically, the duty cycle generation unit 230 includes a duty cycle generator 231, a duty cycle comparator 232, and a regulator 233. The duty cycle generator 230 generates an initial duty cycle based on the relationship as mentioned above. The comparator 232 is coupled to the voltage output terminal VOUT, and configured to compare the detected output voltage with a reference output voltage to generate a difference therebetween, and to transmit the generated difference to the regulator 233. The regulator 233 is, for example, a PI regulator as shown therein, which is coupled between the duty cycle comparator 232 and the duty cycle generator 231. The regulator 233 generates a duty cycle regulation value based on the difference determined by the duty cycle comparator 232, and transmits the duty cycle adjustment value to the duty cycle generator 231. The duty cycle generator 231 regulates the initial duty cycle based on the duty cycle adjustment value to achieve compensation. With such arrangement, when the duty cycle generation unit 230 detects that the output voltage at the voltage output terminal VOUT is different from the desired reference output voltage, the current duty cycle is compensated by adjustment of the PI regulator, to cause it to change the control on the switched capacitor buck circuit 200 and thus obtain the desired output voltage.

Figure 6:
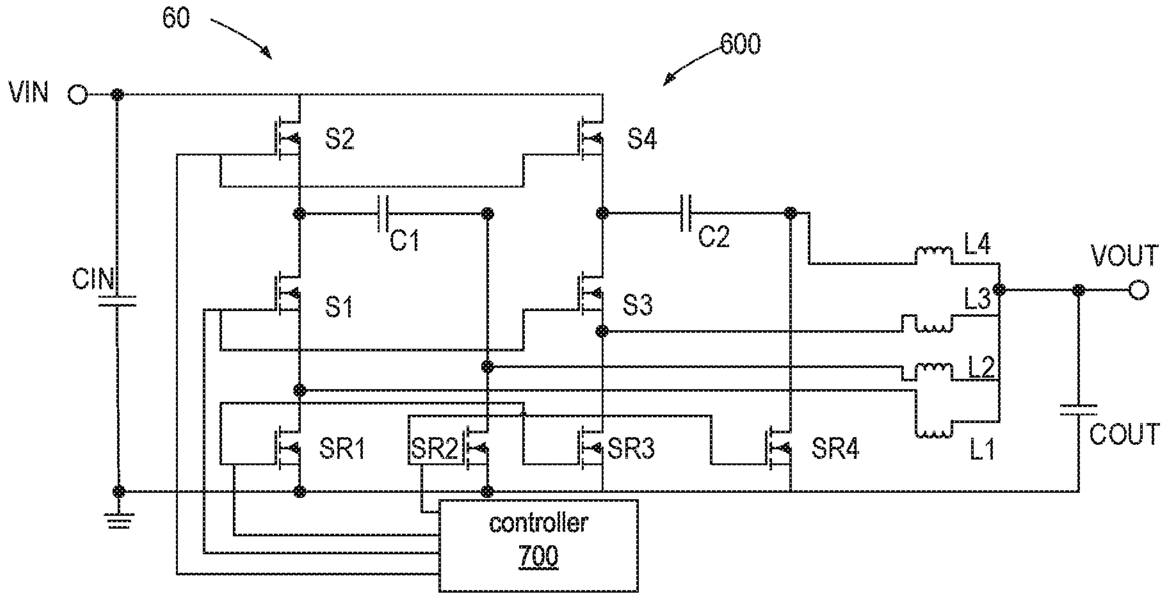
FIG. 6 illustrate a schematic diagram of a cascade buck circuit according to the present disclosure.

In some embodiments, in order to boost the output power, the buck circuit may include multi-stage switches and output inductors. FIG. 6 illustrates a schematic diagram of a power supply 60 according to the present disclosure, which includes a cascade buck circuit 600 and a controller 700. As shown therein, in addition to the same elements included in the switched capacitor buck circuit 200 in FIG. 2, the switched capacitor buck circuit 600 further includes a third switch S3, a third complementary switch SR3, a fourth switch S4, a fourth complementary switch SR4, and a second capacitor C2. The first end of the fourth switch S4 is connected to the voltage input terminal VIN. The second terminal of the fourth switch S4 is connected to the first end of the second capacitor C2 and the first end of the third switch S3. The second end of the third switch S3 is connected to the first end of the third complementary switch SR3 and the voltage output terminal VOUT. The second end of the second capacitor C2 is connected to the first end of the fourth complementary switch SR4 and the voltage output terminal VOUT. The second end of the third complementary switch SR3 is connected to the second end of the fourth complementary switch SR4 and the ground.

In addition, the control terminal of the third switch S3 is connected to the control terminal of the first switch S1. The control terminal of the third complementary switch SR3 is connected to the control terminal of the first complementary switch SR1. The control terminal of the fourth switch S4 is connected to the control terminal of the second switch S2. The control terminal of the fourth complementary switch SR4 is connected to the control terminal of the second complementary switch SR2. Such connection mode enables the controller 700 to simultaneously control the third complementary switch SR3 and the first complementary switch SR1, simultaneously control the third switch S3 and the first switch S1, simultaneously control the fourth switch S4 and the second switch S2, and simultaneously control the fourth complementary switch SR4 and the second complementary switch SR2 in the same way, to thus implement the control solution according to the present disclosure.

The foregoing description of embodiments of the disclosure has been presented for purposes of illustration and description, and is not intended to be exhaustive or limited to the embodiments disclosed. Many modifications and variations will be apparent to those of ordinary skill in the art without departing from the scope and spirit of the various embodiments described. The terminology used herein was chosen in order to best explain the principle of the embodiments, the practical application, or the technical improvement of the technology in the marketplace, or to enable others of ordinary skill in the art to understand the embodiments disclosed herein.

The invention claimed is:

1. A power supply, comprising a buck circuit and a controller for controlling the buck circuit, wherein the buck circuit comprises a first switch, a first complementary switch, a second switch, a second complementary switch, a first capacitor, a first output inductor, and a second output inductor, wherein a first end of the second switch is connected to a voltage input terminal of the power supply, a second end of the second switch is connected to a first end of the first capacitor and a first end of the first switch, a second end of the first switch is connected to a first end of the first complementary switch and a first end of the first output inductor, a second end of the first capacitor is connected to a first end of the second complementary switch and a first end of the second output inductor, a second end of the first complementary switch and a second end of the second output inductor are connected to a voltage output terminal of the power supply, and wherein the controller is configured to:

use a first duty cycle to control switching of the first switch; and use a second duty cycle to control switching of the second switch, a switching cycle of the first switch being equal to a switching cycle of the second switch with respect to cycle length, wherein the first duty cycle is greater than 0.5, and the second duty cycle is equal to 0.5, wherein the controller comprises:

a first control unit with a first end coupled to a control terminal of the first switch and a second end coupled to a control terminal of the first complementary switch, the first control unit configured to send a control signal to the control terminal of the first switch and the control terminal of the first complementary switch;

a second control unit with a first end coupled to a control terminal of the second switch and a second end coupled to a control terminal of the second complementary switch, the second control unit configured to send a control signal to the control terminal of the second switch and the control terminal of the second complementary switch;

a duty cycle generation unit configured to generate the first duty cycle; and a duty cycle limiter coupled between the duty cycle generation unit and the second control unit, and configured to output the second duty cycle of 0.5 to the second control unit in response to determining that the first duty cycle received from the duty cycle generation unit is greater than 0.5.

2. The power supply of claim 1, wherein a time of switching the second switch from open to closed is different from a time of switching the first switch from closed to open by half of the cycle length.

3. The power supply of claim 1, wherein the controller is coupled to the first complementary switch, and configured to control the first complementary switch to open in a case where the first switch is closed and to control the first complementary switch to close in a case where the first switch is open, and wherein the controller is further coupled to the second complementary switch, and configured to control the second complementary switch to open in a case where the second switch is closed and to control the second complementary switch to close when the second switch is open.

4. The power supply of claim 1, wherein the duty cycle generation unit comprises a duty cycle generator configured to:

acquire a reference output voltage and an input voltage of the voltage input terminal; and generate the first duty cycle based on the reference output voltage and the input voltage.

5. The power supply of claim 4, wherein the first duty cycle is determined by:

$$D = \frac{2 * V_{out}}{V_{in}}$$

where $V_{in}$ is the input voltage, $V_{out}$ is the reference output voltage, and D is the first duty cycle.

6. The power supply of claim 4, wherein the duty cycle generation unit further comprises:

a duty cycle comparator coupled to the voltage output terminal and configured to determine a difference between an output voltage at the voltage output terminal and the reference output voltage; and a regulator coupled between the duty cycle comparator and the duty cycle generator and configured to determine, based on the difference determined by the duty cycle comparator, a duty cycle adjustment value, wherein the duty cycle generator is further configured to adjust the first duty cycle based on the duty cycle adjustment value received.

7. The power supply of claim 1, wherein the buck circuit further comprises a third switch, a third complementary switch, a fourth switch, a fourth complementary switch, a second capacitor, a third output inductor, and a fourth output inductor, wherein a first end of the fourth switch is connected to the voltage input terminal, a second end of the fourth switch is connected to a first end of the second capacitor and a first end of the third switch, a second end of the third switch is connected to a first end of the third complementary switch and a first end of the third output inductor, a second end of the second capacitor is connected to a first end of the fourth complementary switch and a first end of the fourth output inductor, a second end of the third complementary switch and a second end of the fourth complementary switch are grounded, and a second end of the third output inductor and a second end of the fourth output inductor are connected to the voltage output terminal, wherein a control terminal of the third switch is connected to the control terminal of the first switch, a control terminal of the third complementary switch is connected to the control terminal of the first complementary switch, a control terminal of the fourth switch is connected to the control terminal of the second switch, and a control terminal of the fourth complementary switch is connected to the control terminal of the second complementary switch.

8. The power supply of claim 1, wherein the first switch, the first complementary switch, the second switch, and the second complementary switch comprises one of: a Metal-Oxide-Semiconductor Field-Effect Transistor, an Insulated Gate Bipolar Transistor, or a triode.

9. A method for controlling a power supply, the power supply comprising a buck circuit, the buck circuit comprising a first switch, a first complementary switch, a second switch, a second complementary switch, a first capacitor, a first output inductor, and a second output inductor, wherein a first end of the second switch is connected to a voltage input terminal of the power supply, a second end of the second switch is connected to a first end of the first capacitor and a first end of the first switch, a second end of the first switch is connected to a first end of the first complementary switch and a first end of the first output inductor, a second end of the first capacitor is connected to a first end of the second complementary switch and a first end of the second output inductor, a second end of the first complementary switch and a second end of the second complementary switch are grounded, and a second end of the first output inductor and a second end of the second output inductor are connected to a voltage output terminal of the power supply, the method comprising:

using a first duty cycle to control switching of the first switch; and using a second duty cycle to control switching of the second switch, a switching cycle of the first switch being equal to a switching cycle of the second switch with respect to cycle length, wherein the first duty cycle is greater than 0.5, and the second duty cycle is equal to 0.5, further comprising:

acquiring a reference output voltage and an input voltage of the voltage input terminal;

determining the first duty cycle based on the reference output voltage and the input voltage; and in response to determining that the first duty cycle is greater than 0.5, determining the second duty cycle is 0.5.

10. The method of claim 9, further comprising:

after half of the cycle length following controlling the second switch from open to closed, controlling the first switch from open to closed.

11. The method of claim 9, further comprising:

in response to determining that the first duty cycle is less than 0.5, determining that the second duty cycle is equal to the first duty cycle.

12. The method of claim 9, further comprising:

detecting an output voltage at the voltage output terminal;

comparing the output voltage with the reference output voltage; and in response to determining that a difference between the output voltage and the reference output voltage is greater than a predetermined threshold, determining the first duty cycle based on a current input voltage and the reference output voltage.

13. The method of claim 9, wherein the first duty cycle is determined by:

$$D = \frac{2 * V_{out}}{V_{in}}$$

where $V_{in}$ is the input voltage, $V_{out}$ is the reference output voltage, and D is the first duty cycle.

* * * * *